(12) United States Patent
Gok et al.

(10) Patent No.: US 11,349,264 B2
(45) Date of Patent: May 31, 2022

(54) CAPACITOR-BASED CONNECTOR FOR COAXIAL CABLE

(71) Applicant: Raytheon Technologies Corporation, Farmington, CT (US)

(72) Inventors: Gurkan Gok, Milford, CT (US); Joseph Zacchio, Wethersfield, CT (US); Goran Djuknic, New York, NY (US); Joseph V. Mantese, Ellington, CT (US); Brenda J. Lisitano, Middletown, CT (US); Jonathan Gilson, West Hartford, CT (US); Coy Bruce Wood, Ellington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 16/905,072

(22) Filed: Jun. 18, 2020

(65) Prior Publication Data
US 2021/0288449 A1 Sep. 16, 2021

Related U.S. Application Data

(60) Provisional application No. 62/882,760, filed on Aug. 5, 2019.

(51) Int. Cl.
  *H01R 13/66* (2006.01)
  *H01R 13/719* (2011.01)
  *H01R 24/64* (2011.01)
  *F02C 7/36* (2006.01)

(52) U.S. Cl.
  CPC ....... *H01R 13/6625* (2013.01); *H01R 13/719* (2013.01); *H01R 24/64* (2013.01); *F02C 7/36* (2013.01)

(58) Field of Classification Search
  CPC ............. H01R 13/6625; H01R 13/719; H01R 24/64
  USPC ........................................... 439/676
  See application file for complete search history.

(56) References Cited

U.S. PATENT DOCUMENTS

| 3,145,532 | A | * | 8/1964 | Moss | F02C 7/277 60/788 |
| 3,892,975 | A | | 7/1975 | Yannone et al. | |
| 4,404,797 | A | * | 9/1983 | Payne | F02C 7/32 290/43 |

(Continued)

FOREIGN PATENT DOCUMENTS

WO 2015130563 A1 9/2015

OTHER PUBLICATIONS

European Search Report for EP Application No. 20188755.1 dated Feb. 3, 2021.

*Primary Examiner* — Alexander Gilman
(74) *Attorney, Agent, or Firm* — Carlson, Gaskey & Olds, P.C.

(57) ABSTRACT

A gas turbine engine includes a housing including a first component providing an AC signal into an input cable. The input cable extends to an input conductive plate. The input conductive plate is in contact with a dielectric plate, and an output conductive plate is attached to an opposed side of the dielectric plate. The output connective plate extends to an output cable extending to a second component, such that a capacitance based connection is provided between the input and output cables, to communicate from first component sensor to the second component.

10 Claims, 5 Drawing Sheets

(56) References Cited

U.S. PATENT DOCUMENTS

| | | | | |
|---|---|---|---|---|
| 5,252,860 A * | 10/1993 | McCarty | | F02C 9/28 290/40 R |
| 6,496,353 B1 * | 12/2002 | Chio | | H01R 9/0503 361/306.1 |
| 6,647,328 B2 * | 11/2003 | Walker | | B60R 25/02 701/36 |
| 6,798,310 B2 * | 9/2004 | Wong | | H01P 1/2007 333/12 |
| 7,623,332 B2 * | 11/2009 | Frank | | H01R 24/48 361/119 |
| 7,823,391 B2 * | 11/2010 | Beardsley | | F02C 7/277 60/788 |
| 7,915,980 B2 | 3/2011 | Unger et al. | | |
| 7,952,449 B2 * | 5/2011 | Yagisawa | | H01P 5/026 333/33 |
| 8,424,280 B2 * | 4/2013 | Moore | | F02C 7/32 60/39.163 |
| 8,565,998 B2 * | 10/2013 | Brown | | F02C 9/00 701/100 |
| 8,888,528 B2 * | 11/2014 | Van Swearingen | | H01G 2/10 439/578 |
| 8,894,439 B2 * | 11/2014 | Van Swearingen | | H01R 12/79 439/578 |
| 9,048,527 B2 * | 6/2015 | Vaccaro | | H01Q 1/00 |
| 9,091,216 B2 * | 7/2015 | Macfarlane | | F04D 27/0261 |
| 9,097,210 B2 * | 8/2015 | Delong | | F02K 1/76 |
| 9,458,734 B2 * | 10/2016 | Mitchell | | F02C 9/00 |
| 9,506,405 B2 * | 11/2016 | Vos | | B60K 6/42 |
| 9,559,552 B2 * | 1/2017 | Harwath | | H01R 9/0506 |
| 9,755,379 B1 * | 9/2017 | Harwath | | H01R 24/40 |
| 9,790,834 B2 * | 10/2017 | Miller | | G01K 3/06 |
| 9,945,252 B2 * | 4/2018 | Snape | | F01D 25/12 |
| 10,378,374 B2 * | 8/2019 | Suciu | | F02C 7/25 |
| 10,432,119 B2 * | 10/2019 | Choi | | F02C 9/28 |
| 10,519,869 B2 * | 12/2019 | Attridge | | F02K 3/06 |
| 10,590,842 B2 * | 3/2020 | Ullyott | | F02B 63/04 |
| 10,704,810 B2 * | 7/2020 | Snell | | F25B 1/053 |
| 10,855,012 B2 * | 12/2020 | Lim | | G06F 11/30 |
| 10,868,867 B2 * | 12/2020 | Binder | | H04L 67/12 |
| 10,927,763 B2 * | 2/2021 | Suciu | | F01D 25/12 |
| 10,962,723 B2 * | 3/2021 | Wood | | G02B 6/3897 |
| 11,021,243 B1 * | 6/2021 | Finnell | | B64C 11/007 |
| 11,055,615 B2 * | 7/2021 | Litichever | | G06N 3/08 |
| 2004/0042149 A1 * | 3/2004 | Devine | | H01T 4/08 361/119 |
| 2006/0042252 A1 * | 3/2006 | Derouineau | | F02C 9/26 60/703 |
| 2007/0126596 A1 | 6/2007 | Hall et al. | | |
| 2007/0249193 A1 * | 10/2007 | Penumatcha | | H01R 43/20 439/125 |
| 2011/0033155 A1 * | 2/2011 | Daikuhara | | G02B 6/26 385/72 |
| 2012/0309230 A1 | 12/2012 | Watanabe et al. | | |
| 2013/0072048 A1 * | 3/2013 | Schafer | | H01R 13/622 439/372 |
| 2014/0134863 A1 | 5/2014 | Van Swearingen et al. | | |
| 2014/0340072 A1 * | 11/2014 | Chamarti | | G01R 15/181 324/76.11 |
| 2016/0203887 A1 * | 7/2016 | Wiemeyer | | H01R 13/7197 174/74 R |
| 2017/0018831 A1 | 1/2017 | Henry et al. | | |
| 2017/0306852 A1 * | 10/2017 | Attridge | | F02C 7/32 |

* cited by examiner

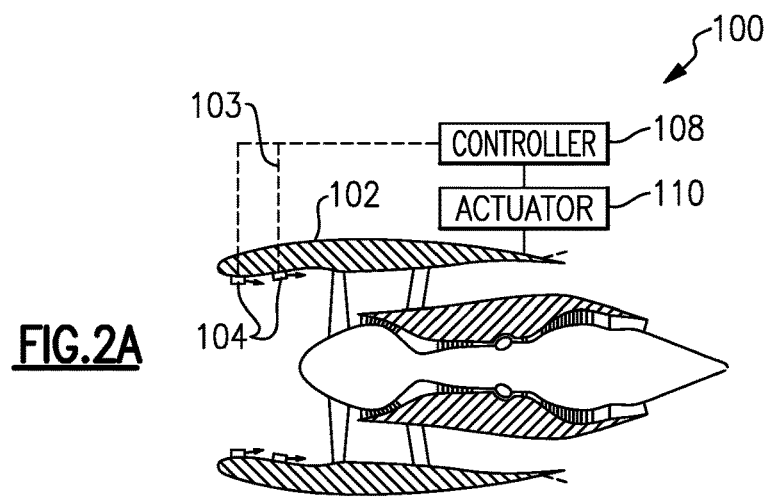
FIG.2A
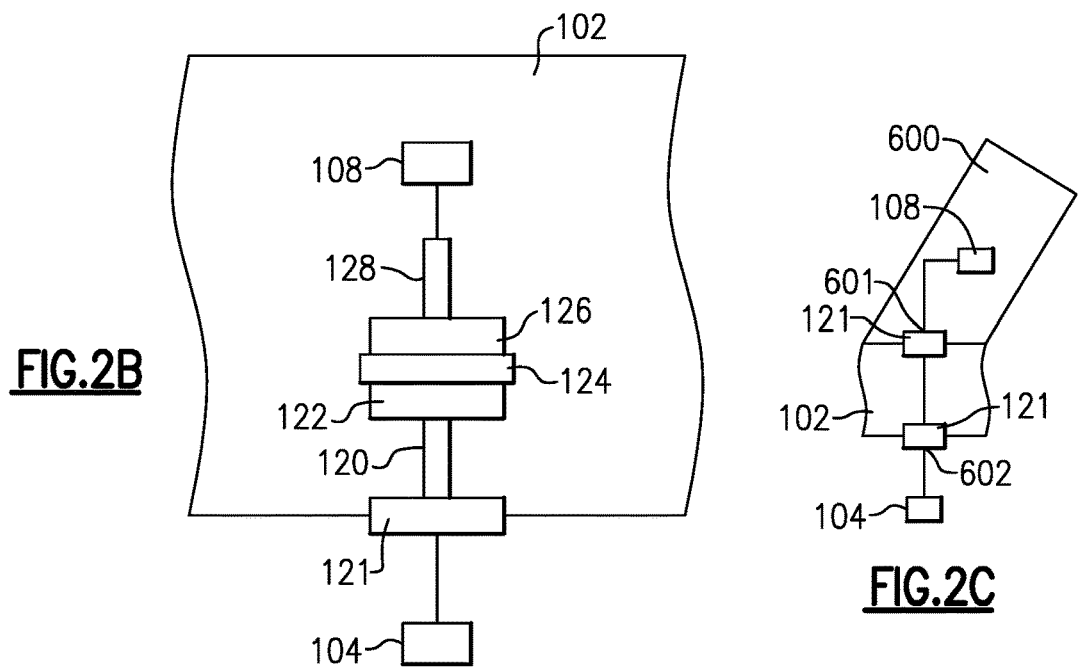
FIG.2B
FIG.2C
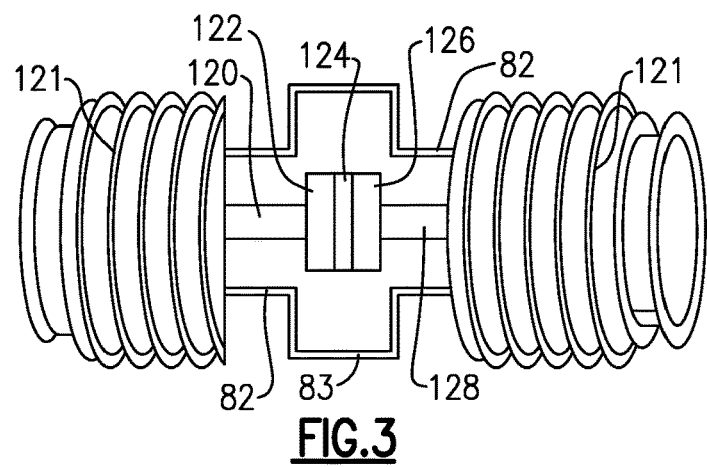
FIG.3

CAPACITOR-BASED CONNECTOR FOR COAXIAL CABLE

CROSS-REFERENCE TO RELATED APPLICATIONS

This application claims priority to U.S. Provisional Patent Application No. 62/882,760 filed Aug. 5, 2019.

BACKGROUND

This application relates to a capacitor-based connector for transferring signals between coaxial cables.

Cables are known to carry signals between various components. For any number of applications, an input cable must be connected to an output cable. One such application is entering, or leaving, a housing. Traditionally, such connections have relied upon a pin and socket connection. In practice, this can be a source of failure, as such connection can corrode, oxidize, become bent or broken, contaminated with dirt, or any number of other similar challenges.

One particular location for using such cables is in a gas turbine engine. As known, a gas turbine engine may be utilized to drive aircraft. Such applications are particularly prone to challenging conditions.

Capacitor-based connectors are known for coaxial cables, however, they have generally been simply designed. Moreover, there applications have been limited and they have not been proposed for use in gas turbine engines.

SUMMARY

In a featured embodiment, a gas turbine engine includes a housing including a first component providing an AC signal into an input cable. The input cable extends to an input conductive plate. The input conductive plate is in contact with a dielectric plate, and an output conductive plate is attached to an opposed side of the dielectric plate. The output connective plate extends to an output cable extending to a second component, such that a capacitance based connection is provided between the input and output cables, to communicate from first component sensor to the second component.

In another embodiment according to the previous embodiment, the input cable connects to the output cable through a firewall.

In another embodiment according to any of the previous embodiments, the first component is a sensor and the second component is a controller receiving signals from the sensor.

In another embodiment according to any of the previous embodiments, the housing is a housing mounted outwardly of a fan.

In another embodiment according to any of the previous embodiments, the first component is a sensor and the second component is a controller receiving signals from the sensor.

In another embodiment according to any of the previous embodiments, polytetrafluoroethylene is received within a chamber between an inner periphery of at least one of an outer conductor and the input and output cables.

In another embodiment according to any of the previous embodiments, the dielectric plate is formed of a polyamide.

In another embodiment according to any of the previous embodiments, a chamber between an outer periphery of at least one the conductive plates and an inner periphery of a connector housing that surrounds the inner conductive plates. The outer conductive plates and the dielectric plate receives air.

In another embodiment according to any of the previous embodiments, the input and output cables extend to threaded connectors which are connected to the sensor and the control, respectively.

In another embodiment according to any of the previous embodiments, the first component is a sensor and the second component is a controller receiving signals from the sensor.

In another embodiment according to any of the previous embodiments, the dielectric plate is formed of a polyamide.

In another embodiment according to any of the previous embodiments, a chamber between an outer periphery of at least one the conductive plates and an inner periphery of a connector housing that surrounds aid inner conductive plates. The outer conductive plates and the dielectric plate receives air.

In another embodiment according to any of the previous embodiments, polytetrafluoroethylene is received within a chamber between an inner periphery of at least one of an outer conductor and the input and output cables.

In another embodiment according to any of the previous embodiments, the input and output cables extend to threaded connectors which are connected to the sensor and the control, respectively.

In another embodiment according to any of the previous embodiments, polytetrafluoroethylene is received within a chamber between an inner periphery of at least one of an outer conductor and the input and output cables.

In another embodiment according to any of the previous embodiments, the dielectric plate is formed of a polyamide.

In another embodiment according to any of the previous embodiments, a chamber between an outer periphery of at least one the conductive plates and an inner periphery of a connector housing that surrounds the inner conductive plates. The outer conductive plates and the dielectric plate receives air.

In another embodiment according to any of the previous embodiments, the dielectric plate is formed of a polyamide.

In another embodiment according to any of the previous embodiments, a chamber between an outer periphery of at least one the conductive plates and an inner periphery of a connector housing that surrounds the inner conductive plates. The outer conductive plates and the dielectric plate receives air.

In another embodiment according to any of the previous embodiments, a bracket mounts a plurality of the input cables which are connected to a plurality of output cable through respective ones of input conductive plate, the output conductive plate and the dielectric plate.

These and other features may be best understood from the following drawings and specification.

BRIEF DESCRIPTION OF THE DRAWINGS

FIG. 2A schematically shows a portion of a gas turbine engine.

FIG. 2B shows a detail of the FIG. 2A engine.

FIG. 2C shows a further embodiment.

FIG. 3 schematically shows a connection.

DETAILED DESCRIPTION

Figure 1:
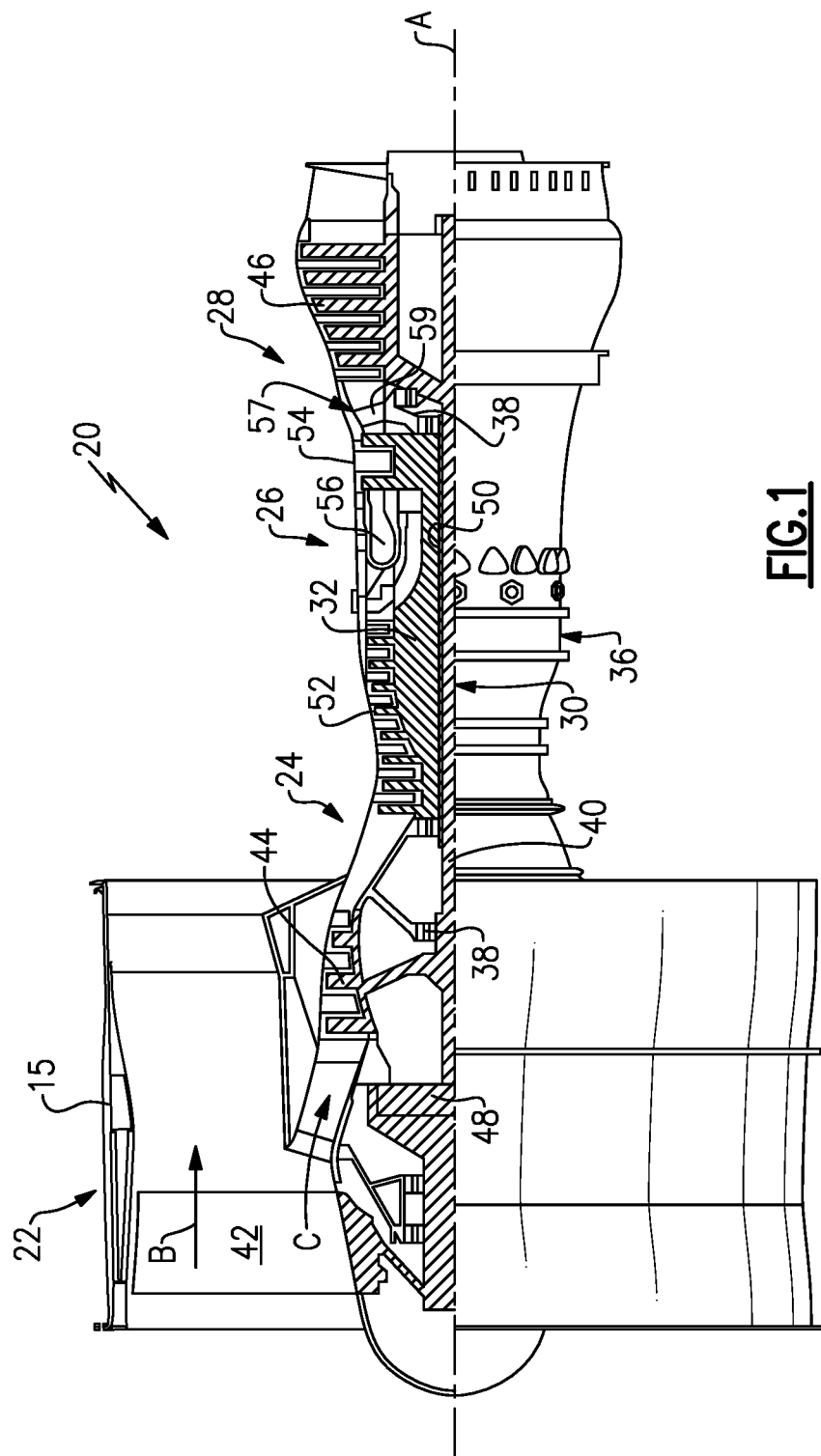
FIG. 1 shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 is one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption— also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

FIG. 2A shows an engine 100, which may incorporate many, if not all, of the components illustrated in FIG. 1. Here, an outer fan case or nacelle 102 incorporates sensors 104. Connections 103 connect the sensors 104 to a controller 108. The controller 108 may be a standalone controller or may be a full authority digital controller such as for the entire gas turbine engine 100 ("FADEC"). The controller 108 may control an actuator 110 shown schematically. On the other hand, the controller 108 may control any number of other components.

The use of sensors, controllers, and actuators in gas turbine engines is known. It is a connector for transferring a signal from an input cable to an output cable, which is the subject of this disclosure.

FIG. 2B shows the housing 102. An input cable 120 extends to the sensor 104. A cable 120 extends to conductive plate 122 that sits against the dielectric plate 124. Another conductive plate 126 is on the opposing side of the dielectric plate 124. The plates 122 and 126 may be secured to the dielectric plate 124 through a mechanical connection (screws, rivets, pins or similar) or a chemical connection such as adhesive means. A connector 128 extends from the conductive plate 126 to control 108. A threaded connection 121, as disclosed below may be utilized. In fact, as disclosed below, there will also be outer conductors or housing around the connection members shown here.

With this arrangement, signals are safely and reliably transmitted from a hostile location within the housing 102 to the control 108. The use of the capacitor-based connection between the conductive plates, with the intermediate dielectric plate, provides a more reliable connection than the prior art pin and socket connections.

FIG. 2C shows an option wherein a first threaded connection 121 enters housing 102 with a connector 602 to the sensor 104. A second threaded connection 121 at a connector 601 leaves the housing 102 and enters a pylon 600. Control 108 is mounted within pylon 600. Connectors 601 and 602 may be generally as shown in FIG. 2B.

FIG. 3 schematically shows the connection with outer conductors 82 surrounding inner conductors 120 and 128 and central housing 83 surrounding the plates 122 and 126, along with the dielectric intermediate plate 124. Threaded connections 121 are also shown.

The outer conductor may be a metal shield or braid, as an example. The inner conductor may be also formed of metal, like copper or aluminum.

The dielectric plate may be formed from polyamide material.

One particular application is transmitting AC signals such as from the sensor 104 to the controller 108.

Figure 4B:
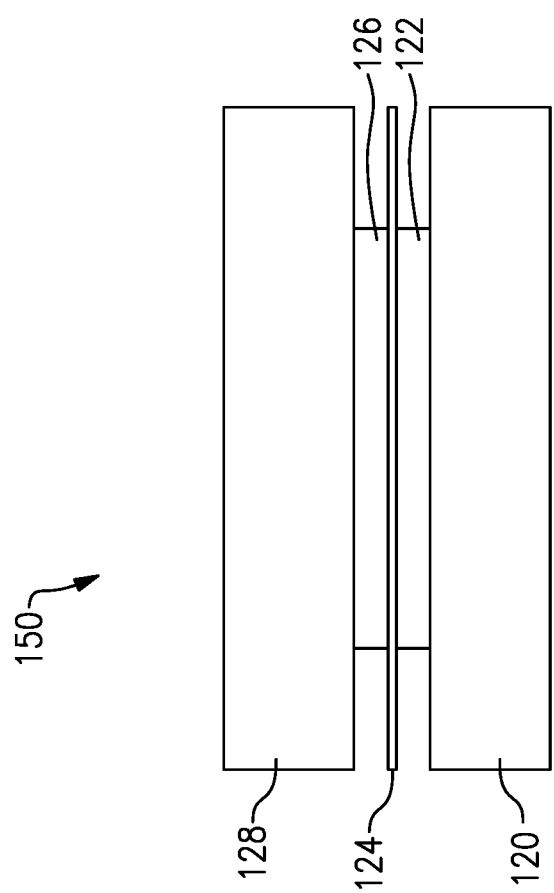
FIG. 4B shows a distinct view.
Figure 4A:
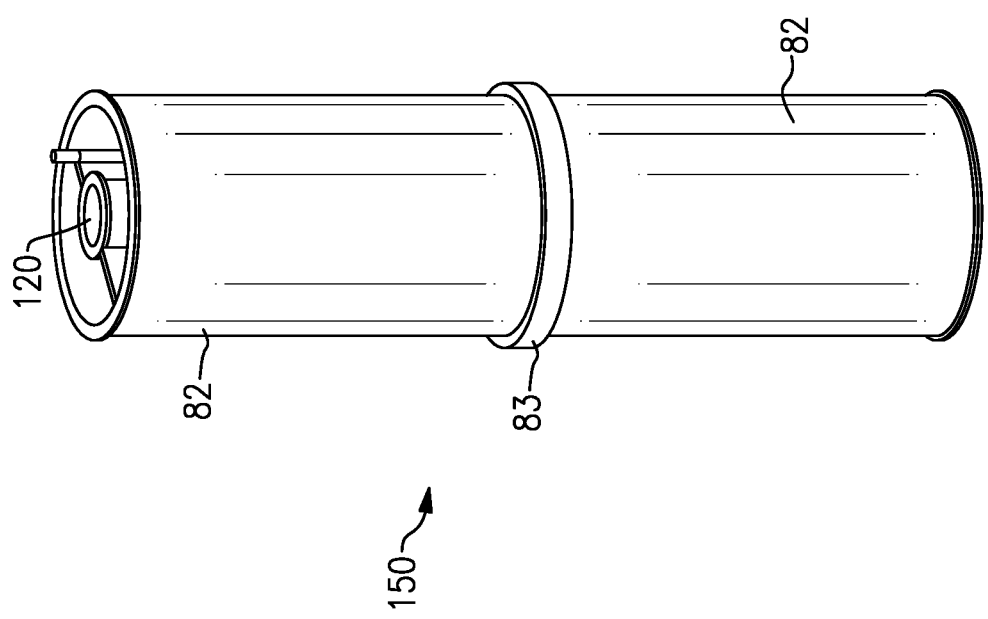
FIG. 4A shows a detail of the connection.

FIG. 4A shows a connection including the outer conductors 82 and central housing 83. It should be understood the inner and outer conductors may also be provided with outer insulation.

FIG. 4B shows the plates 122 and 126 with the intermediate plate 124 and conductors 120/128.

Figure 5:
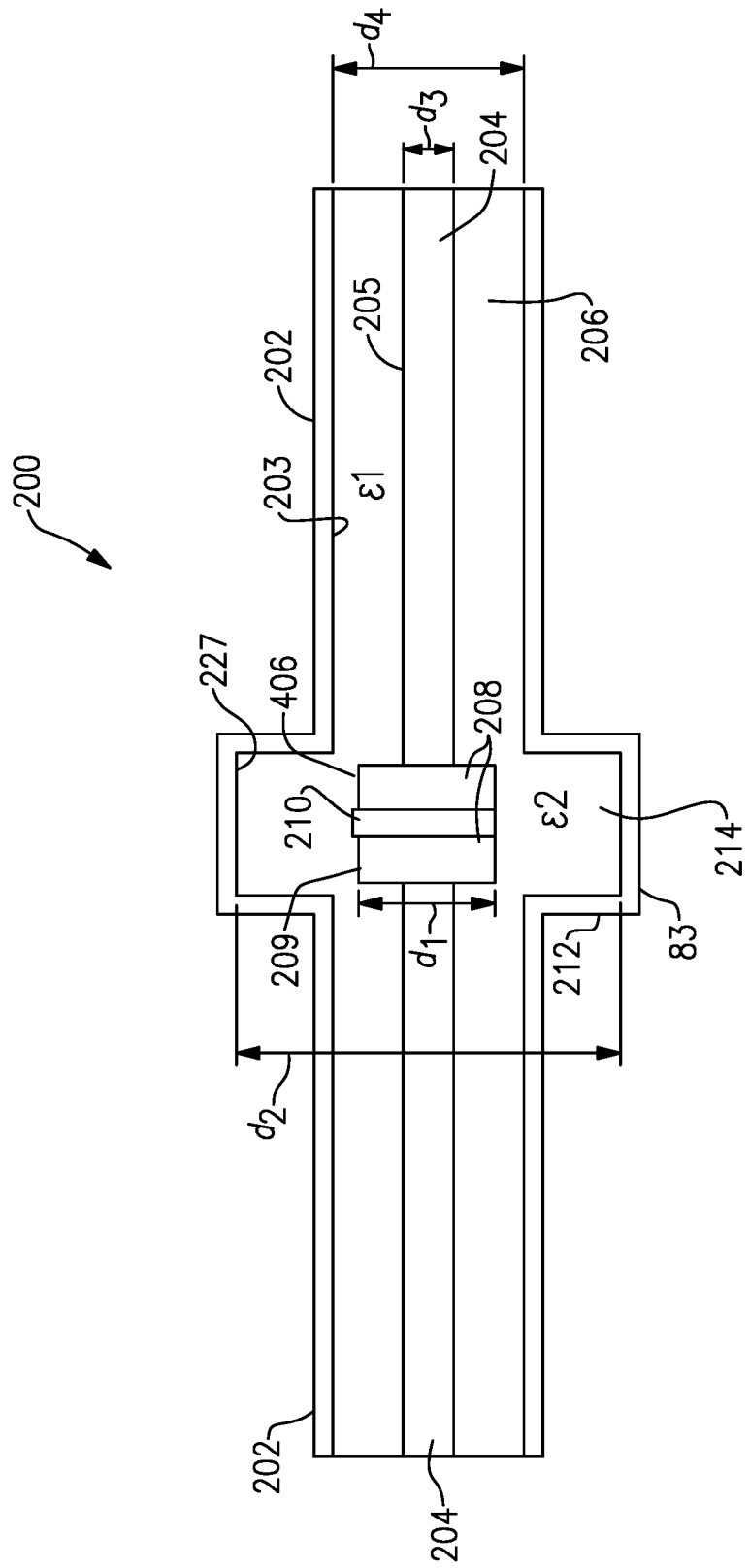
FIG. 5 shows certain operational characteristics of the connection according to this disclosure.

FIG. 5 schematically shows certain operational features. In the embodiment 200, the outer conductors 202 surround the inner conductors 204. The inner conductors 204 extend to conductive plates 208, which are secured to an intermediate dielectric plate 210. A chamber 206 is defined between an outer periphery of the conductive plates 208 and an inner surface 203 of the outer conductors 202.

A first diameter $d_1$ is defined to at least one of the conductive plates 208. A second diameter $d_2$ is defined to an inner periphery 227 of the outer housing 83. A chamber 214 is defined between an outer periphery 406 and an inner periphery 227 of the outer housing 83. A third diameter $d_3$ is defined to the outer surface 205 of at least one of the inner conductors 204. A fourth diameter $d_4$ is defined to the inner surface 203 of the outer connector 202.

In embodiments, the chambers 206 may be filled with polytetrafluoroethylene. The chamber 214 may be filled with air.

It is desirable to generally match impedance (Z) along the entire flow path of the signal from an input to an output.

This disclosure is particularly beneficial for the transmission of microwave signals.

Notably, Table 1 provides sample values for the geometry in question. The $\varepsilon_1$ and $\varepsilon_2$ are the values of relative dielectric constants in the chambers 206 and 214.

As set forth above, the dimensions $d_1$ to $d_4$ can be selected to ensure the impedance is as desired along the entire flow path. Samples are shown in the below Table 1.

TABLE 1

| | Value |
|---|---|
| $Z_0$ | 50 Ohms |
| $d_1$ | 2.6 [mm] |
| $d_2$ | 6.0 [mm] |
| $d_3$ | 1.0 [mm] |
| $d_4$ | 3.5 [mm] |
| $\varepsilon_1$ (Teflon) | 2.1 |
| $\varepsilon_2$ (Air) | 1.0 |

Of course different materials may be included in the different chambers, and different dimensions can be utilized. However, in embodiments, the dimension $d_2$ will be greater than the dimension $d_4$. The dimension $d_1$ will be greater than the dimension $d_3$.

Figure 6:
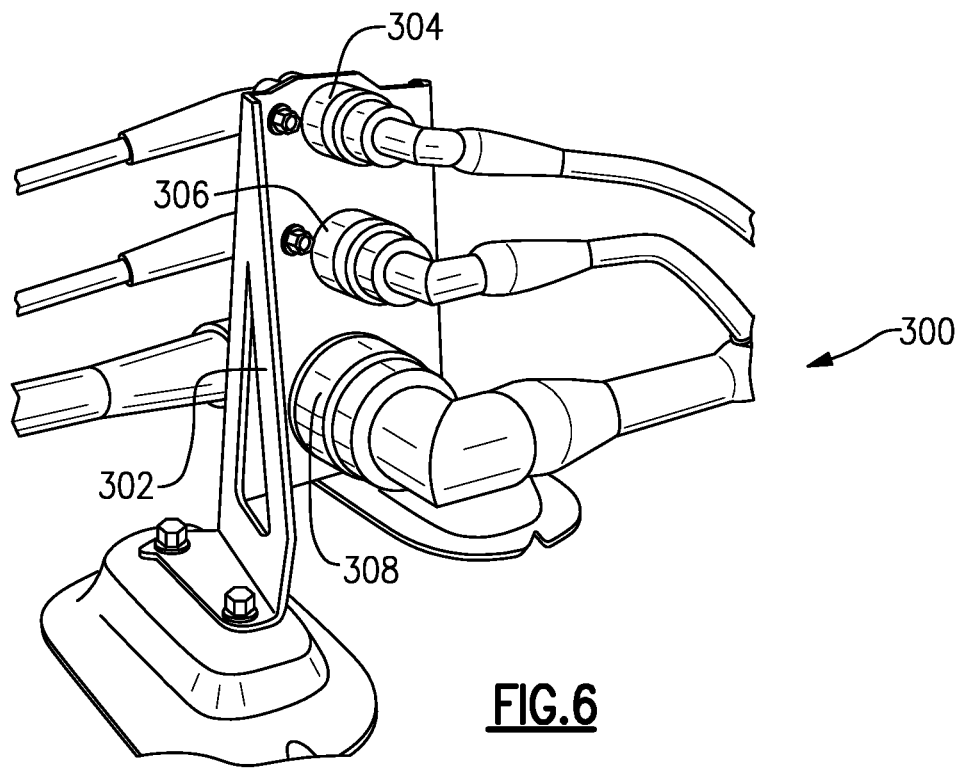
FIG. 6 shows another embodiment.

FIG. 6 shows an embodiment 300 wherein a bracket 302 receives three of the cables 304, 306 and 308 generally structured as disclosed above. The bracket may assist in routing the cables, and the connection within a gas turbine engine chamber. Such brackets are utilized to properly position cable within such chambers, but the disclosed connection provides benefits when utilized in combination with such a bracket.

Figure 7:
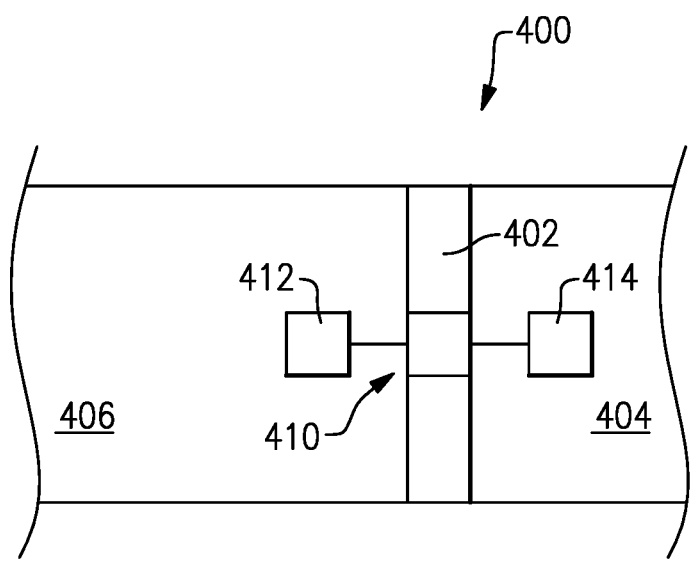
FIG. 7 shows yet another embodiment.

FIG. 7 shows yet another embodiment 400 wherein a firewall 402, such as is known, is shown schematically received within a chamber having a "hot side" 404, which may be exposed to flame and a "cool side" 406 which is protected from the hot side 404, and flame, by the firewall 402. A connection 410 such as disclosed above may be utilized to connect a controller 412 on the cool side 406 to a sensor 414 on the hot side. Other communications through a firewall may also benefit from the connection 410.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a first component providing an AC signal into an input cable, said input cable being electrically coupled to an input conductive plate, said input conductive plate being in contact with a dielectric plate, and an output conductive plate being attached to an opposed side of said dielectric plate, said output conductive plate being electrically coupled to an output cable extending to a second component, such that a capacitance based connection is provided between said input and output cables, to communicate from said first component to said second component; and
a firewall, and the capacitive based connection between said input cable and said output cable extending through said firewall, such that said firewall surrounding said capacitive based connection.

2. The gas turbine as set forth in claim 1, wherein a first chamber between an outer periphery of at least one said conductive plates and an inner periphery of a connector housing that surrounds said input conductive plate, said outlet conductive plate and said dielectric plate, receives air.

3. The gas turbine as set forth in claim 1, wherein said dielectric plate is formed of a polyamide.

4. The gas turbine as set forth in claim 3, wherein a first chamber between an outer periphery of at least one said conductive plates and an inner periphery of a connector housing that surrounds said input conductive plate, said outlet conductive plate and said dielectric plate, receives air.

5. The gas turbine as set forth in claim 4, wherein polytetrafluoroethylene is disposed within a second chamber between an inner periphery of a connector housing and said input and output cables.

6. The gas turbine as set forth in claim 1, wherein polytetrafluoroethylene is disposed within a chamber between an inner periphery of at least one of an outer conductor and said input and output cables.

7. The gas turbine engine as set forth in claim 1, wherein a bracket mounts a plurality of said input cables which are electrically coupled to a plurality of output cable through respective ones of said conductive plate, said output conductive plate and said dielectric plate.

8. The gas turbine engine as set forth in claim 1, wherein an outer housing surrounds said input conductive plate, said output conductive plate and said dielectric plate, with said outer housing being received within said firewall, and said outer housing being formed of a metal.

9. The gas turbine engine as set forth in claim 8, wherein said first component is a sensor that is on a hot side of said firewall, and said second component is a controller which is on a cool side of said firewall.

10. The gas turbine as set forth in claim 9, wherein said input and output cables extend to threaded connectors which are connected to said sensor and said control, respectively.

* * * * *